United States Patent

Shoji et al.

[11] Patent Number: 5,848,417
[45] Date of Patent: Dec. 8, 1998

[54] FLEXIBLE INFORMATION INPUT AND OPERATION SELECTION SYSTEM

[75] Inventors: Wataru Shoji; Daisuke Tabuchi; Ichiro Nakajima, all of Tokyo, Japan

[73] Assignee: Sofmap Future Design, Inc., Tokyo, Japan

[21] Appl. No.: 757,137

[22] Filed: Dec. 3, 1996

Related U.S. Application Data

[63] Continuation-in-part of Ser. No. 582,004, Jan. 2, 1996, Pat. No. 5,781,900.

[51] Int. Cl.$^6$ ..................................................... G06F 17/30
[52] U.S. Cl. .......................... 707/102; 345/326; 345/356
[58] Field of Search ................................ 707/1, 100, 101, 707/102, 103, 104, 200, 4, 2, 509, 529; 345/356, 340, 347, 348, 352, 355, 326

[56] References Cited

U.S. PATENT DOCUMENTS

| | | | |
|---|---|---|---|
| 5,297,249 | 3/1994 | Bernstein et al. | 345/356 |
| 5,537,590 | 7/1996 | Amado | 707/2 |
| 5,539,903 | 7/1996 | Kaplan et al. | 707/103 |
| 5,579,466 | 11/1996 | Habib et al. | 707/529 |
| 5,630,122 | 5/1997 | Kaplan et al. | 707/4 |
| 5,632,009 | 5/1997 | Rao et al. | 707/509 |

FOREIGN PATENT DOCUMENTS

WO 95/04974   2/1995   WIPO .

OTHER PUBLICATIONS

Q. Qian, et al.,; Abstraction and Inheritance of Hyperlinks in an Object Oriented Hypertext Database Sysetm;. IEICE Transaction on Information and System; Nov. 1995, No. 11, Toykyo, Japan; pp. 1343–1352.

W. Hall; Ending the Tyranny of the Button; IEEE Multimedia, vol. 1 No. 1, Spring 1994 pp. 60–68.

*Primary Examiner*—Thomas G. Black
*Assistant Examiner*—Ruay Lian Ho
*Attorney, Agent, or Firm*—H. C. Chan

[57] ABSTRACT

The operation of a computer system can be determined by the content of highlighted data on a display device and a predefined criterion. In this computer system, the highlighted data could be located anywhere on the display device. The highlighted data is not related to any embedded links. In one embodiment, a temporary storage buffer is used to store data highlighted by a user. The computer system also contains a table (or database) associating a list of computer operations with a list of keywords and a set of predefined criteria. When a pre-assigned key is pressed, the content of the temporary storage buffer is compared with the list of data in the database. When there is a match, the predefined criteria is used to select the associated operation. After selection, the operation is performed. As a result, the operation performed is related to the content of the highlighted data and the predefined criteria.

11 Claims, 4 Drawing Sheets

FLEXIBLE INFORMATION INPUT AND OPERATION SELECTION SYSTEM

CROSS REFERENCE TO RELATED APPLICATION

This patent application is a continuation-in-part of patent application Ser. No. 08/582,004 filed Jan. 2, 1996 and now U.S. Pat. No. 5,781,900.

FIELD OF THE INVENTION

The present invention relates to computer systems, and more particularly to computer programs that can perform a selected one of a plurality of operations associated with input data appearing on a display device of the computer system.

BACKGROUND OF THE INVENTION

Many computer programs display information on a display device, such as a video monitor. The information is generally in the form of text and graphic data. It is sometimes desirable to allow a user to highlight a portion of the displayed information and the computer program then performs one of a number of operations related to the highlighted information.

An example to show the usefulness of such an ability is a children's learning program in which a child can type in a word anywhere on the display device, press a pre-assigned key, and the computer can perform an action (e.g., pronounce the word and/or explain the meaning of the word) based on some criteria (e.g., pronounce and explain the word if the child is more than six years old, otherwise pronounce the word only).

There are prior art programs which associate a text string or an icon with specific operations of a computer. For example, many educational programs display text and graphics on a computer monitor. A child can highlight a word (or click on an icon) and the computer programs can pronounce the word (or perform a predetermined operation associated with the icon). However, the position and content of the highlighted area are fixed because they are generated by the computer program. Thus, the computer program can easily determine the content (e.g., the word or icon) being highlighted based on its position, and perform the necessary operations. These programs do not allow a child to type in words at any position on the display device, and then performs an operation related to the content of the word. In addition, the association between the highlighted word and the operation (e.g., pronouncing the word or showing related animation) is fixed, and the user cannot alter the relationship. Further, the action performed by the computer in response to highlighting of a word is fixed. The computer cannot take into account of other factors (e.g., the time of the day or the age of the user) and perform different actions.

SUMMARY OF THE INVENTION

The computer system of the present invention uses a temporary storage buffer to store data highlighted by a user. The highlighted data could be located anywhere on a display device of the computer system. The system also contains a database having a plurality of records. Each record contains a key which is associated with one or more branches. In one embodiment of the present invention, the key is in the form of an ASCII character string. In another embodiment of the present invention, the key is in the form of graphic data. Each branch is associated with an executable computer module. When a pre-assigned key is pressed, the content of the temporary storage buffer is compared with the keys in the database. When there is a match, one of the branches associated with the matched key is selected based on previously stored information (e.g., the age of the user) or continuously updated information (e.g., the time of a day). The computer module of the selected branch is then executed. As a result, the operation performed is related to the content of the highlighted data and the selection information.

The relationship between the data and the computer operation can be changed by comparing the content of the temporary storage buffer with different databases. Thus, the same data in the buffer gives rise to different computer operations, when different databases are selected for comparison with the data.

In one embodiment of the present invention, the temporary storage buffer is the clipboard buffer in Microsoft's Windows environment. The user uses a pointing device (such as a mouse) to highlight a word and depresses a pre-assigned key (e.g., control-C). The computer system captures the word and compares it with the keys (which are ASCII-based words) in a database. If there is a match, the computer selects a branch based on previously stored or current information. The computer module associated with this branch is executed. If there is no match, an "action editor" is displayed, which allows the user to enter into the database various branches and actions associated with the unmatched word.

The clipboard could be used to capture graphics. In this case, the keys in the database are graphic data. The computer system compares the captured graphics with graphic data stored in the database.

These and other features and advantages can be understood from the following detailed description of the invention together with the accompanying drawings.

DETAILED DESCRIPTION OF THE INVENTION

The present invention is directed to a novel flexible information input and operations selection system. The following description is presented to enable any person skilled in the art to make and use the invention. Descriptions of specific applications are provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
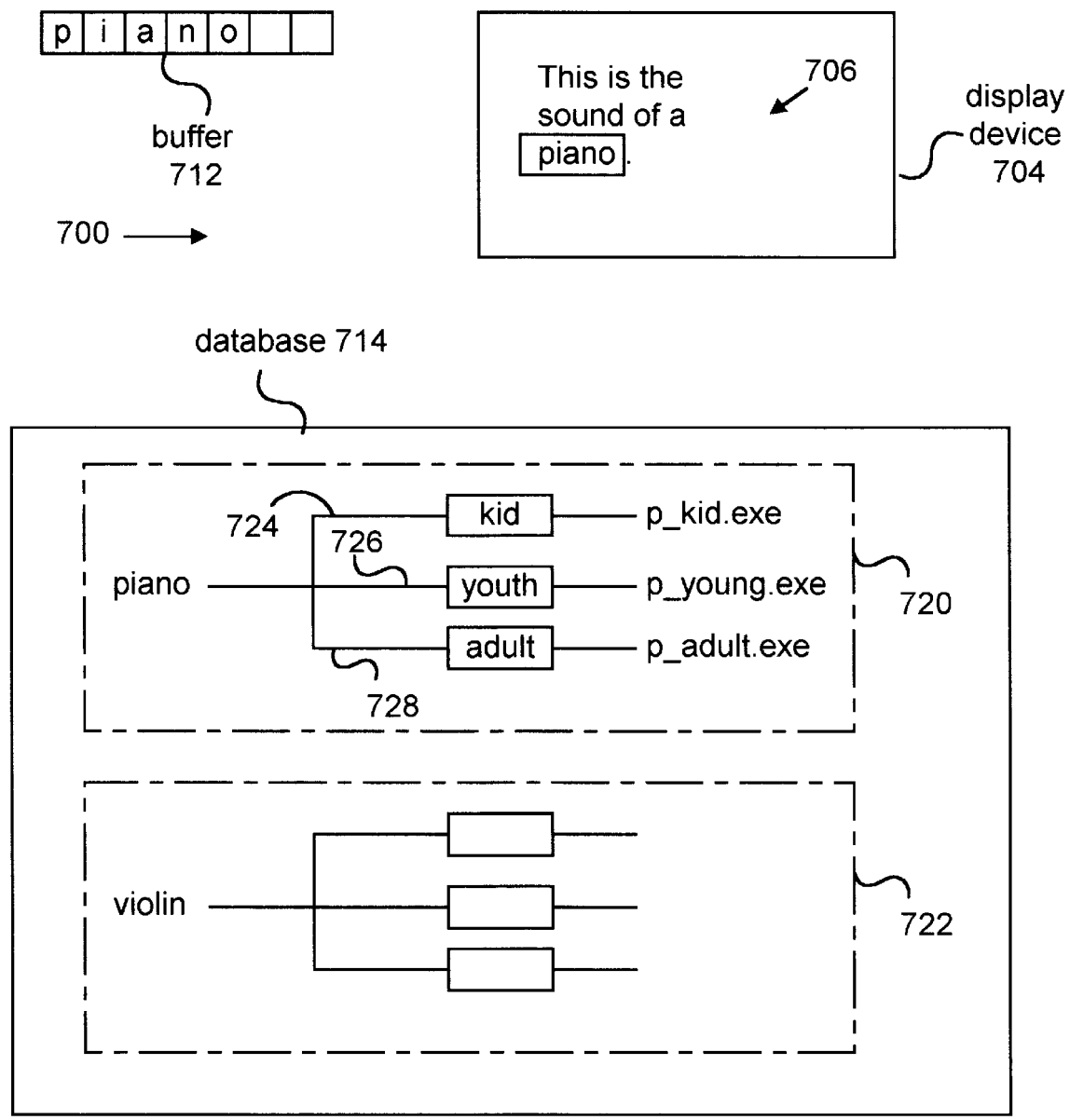
FIG. 1 is a schematic drawing of a computer system operating in accordance with the present invention.

FIG. 1 is a schematic drawing of a computer system 700 which is able to implement a flexible information input and operations selection system in accordance with the present invention. Computer system 700 contains a display device 704. An exemplary ASCII character string 706, "this is a piano," is displayed on display device 704. The word "piano" is highlighted. When a user depresses a pre-assigned key, e.g., control-C, computer system 700 captures the highlighted word, "piano" in a buffer 712. It should be appreciated that the word can be captured to buffer 712 while it is being highlighted or after the pre-assigned key is depressed.

After the pre-assigned key is depressed, computer system 700 accesses a database 714 already loaded in the system memory of computer system 700. Database 714 contains a plurality of records each keyed to the name of a musical instrument (such as record 720 keyed to the word "piano," record 722 keyed to the word "violin"). Each record contains one or more branches which are selectable based on predetermined pieces of information (or a predetermined method of obtaining the information). For example, the "piano" record contains three different branches selectable based on the age of the user (this information can be previously obtained from the user). The first branch (branch 724) is invoked if the user is a kid (e.g., ten years old or younger). A module "p_kid.exe" is executed which draws a picture of the piano and plays a short piece of piano music. The second branch (branch 726) is invoked if the user is a youth (e.g., between eleven and eighteen years old). A module "p_young.exe" is executed which displays simple written information about a piano, in addition to drawing a picture of the piano and playing piano music. The written information is not displayed when executing "p_kid.exe" because a kid would not be interested in reading written information. The third branch (branch 728) is invoked if the user is an adult (e.g., nineteen and older). A module "p_adult.exe" is executed which displays detailed written information of a piano (e.g., its history and how it works).

In this embodiment, computer system 700 compares the word in buffer 712 with the key-words (e.g., "piano" and "violin") in database 714. If a match is found, computer system 700 then retrieves a previously entered selection information (e.g., the age of the user) and uses it to select a branch. Different program module is executed depending on the selection information.

The number of branches in the above example is exemplary. For example, there could be one or more branches for the key "violin." The number of records in the above example is also exemplary. In addition, the information used for the selection could be obtained dynamically, e.g., just prior to the selection, instead of relying on fixed information. Examples of dynamic information are the time of the day when the user types in the word "piano," or the status of remote users if the computer is connected to a network system.

In a computer system, the operating system determines the steps needed to be taken to invoke a program module. It should be easy for persons skilled in the art to write a routine which can follow these steps to invoke a desired program module listed in database 714.

It can be seen from FIG. 1 that the word "piano" can occur anywhere on display device 704. Further, the program being executed depends, in part, on the content of the highlighted word. Thus, a different program will be executed if a different word is highlighted.

The way data is highlighted depends on the structure of computer system 700. In an IBM-compatible computer running under Microsoft Windows environment, data can be highlighted by positioning a cursor (not shown) at a first location on display device 704, depressing a button on a mouse (not shown), and moving the cursor to a second location. Other programs highlight data using other procedures (e.g., Wordperfect running under Microsoft DOS requires the use of a pre-assigned key, "F12," to designate the beginning of highlighted data).

In this embodiment, database 714 has been loaded into system memory from nonvolatile memory (e.g., hard disk, floppy diskette, or CD-ROM) prior to the pressing of the pre-assigned key. It is possible for the user to load a different database into the system memory. It is also possible for the user to load a plurality of databases into the system memory, and select one of these databases to be an active database for comparing with the highlighted word. For example, the user can select databases containing different languages so that system 700 could be used in different countries. It is also possible for the user to switch to different databases at any time (before or after depressing the pre-assigned key).

The flexible information input and operations selection system of the present invention can be implemented using conventional computer program architecture. Alternatively, it could be implemented using a novel "bossless" computer program architecture comprising a plurality of program modules called "cells." Under this architecture, each cell is hierarchically equal, i.e., there is no controlling (or boss) cell. An application can start from any cell, and can terminate at any cell. Typically, many cells are executing either sequentially or concurrently. Various applications can be designed by controlling the operation of these cells. A detailed description of this computer program architecture can be found in a copending patent application (Ser. No. 08/539,806) filed Oct. 5, 1995 and entitled "Bossless Architecture and Digital Cell Technology for Computer Programs." This copending patent application is hereby incorporated by reference.

In this embodiment of the flexible information input and operations selection system, two cells are created to implement the system. One cell is called a clipboard scanning cell and the other cell is called a hyperlink and branch cell. The clipboard scanning cell places highlighted text string in a clipboard buffer commonly used in a windows based operating environment (e.g., Microsoft's Windows software). The clipboard scanning cell is also responsible for detecting the depressing of a pre-assigned key by a user. The hyperlink and branch cell compares the text string in the clipboard with keys (in this embodiment, words in text string form) in a database. The hyperlink and branch cell also causes the computer system to execute appropriate program modules (cells) based on previously stored or dynamic information. If there is no match, the hyperlink and branch cell allows a user to edit the database. The user can enter a new record with a key and branches. A detailed description of using this architecture in a similar system has been disclosed in the above-mentioned patent application (Ser. No. 08/582,004), filed Jan. 2, 1996 and entitled "Flexible HyperLink Association System." This patent application is incorporated hereby by reference.

As explained in more detail in the incorporated applications, each cell is associated with a file, called a DNA file. The characteristics and operation of the cells are determined by their associated DNA files. Cells communicate by writing statements to the DNA files associated with other cells using a protocol called digital shifting function (DSF). Once written, the origin of these DSF statements is ignored. There is no need to "return" to the cells which originate the statements. Further, the DSF statements are executed by the cells without regard to their origins.

The cells execute DSF statements in their associated DNA files. These statements are executed sequentially. The cells retain full control of the execution, i.e., there is no need to turn over execution to other cells during or after the execution of statements. There is no need to report to other cells on the status or results of execution.

In a preferred computer system of the present invention, many cells (in addition to the clipboard scanning cell and hyperlink and a branch cell) are executing in the computer system. Various applications can be designed by controlling the operation of these cells.

Figure 2:
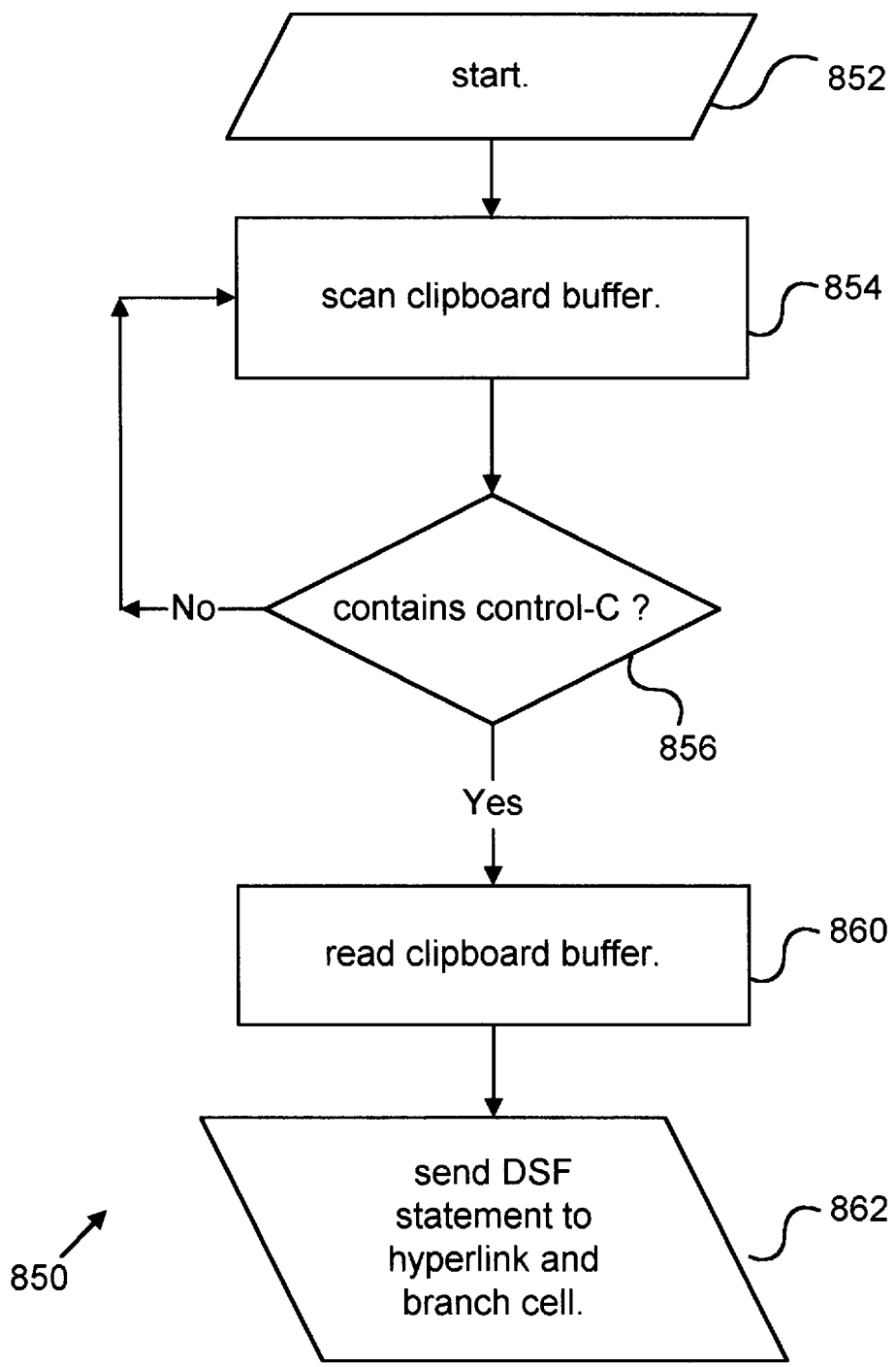
FIG. 2 is a flow chart of a clipboard scanning cell of the present invention.

FIG. 2 is a flow chart 850 of a clipboard scanning cell of the present invention. Flow chart 850 starts at step 852. At predetermined time periods, the clipboard scanning cell scans the clipboard buffer, which is maintained by MS Windows (step 854). In step 856, the scanning cell determines whether the buffer contains a Control-C symbol. If this symbol is not detected, flow chart 850 branches back to step 854. If this symbol is detected, scanning cells reads the content of the clipboard (step 860). It then sends a DSF statement to a hyperlink and branch cell (step 862). For example, if the content of the clipboard buffer is a word "piano," the syntax of the DSF statement is "SEARCH piano," where the word "piano" is a parameter of the SEARCH statement corresponding to the content of the clipboard.

It should be appreciated that the control-C key and the "SEARCH" keyword are exemplary. Other symbols and keywords could be used.

Figure 3:
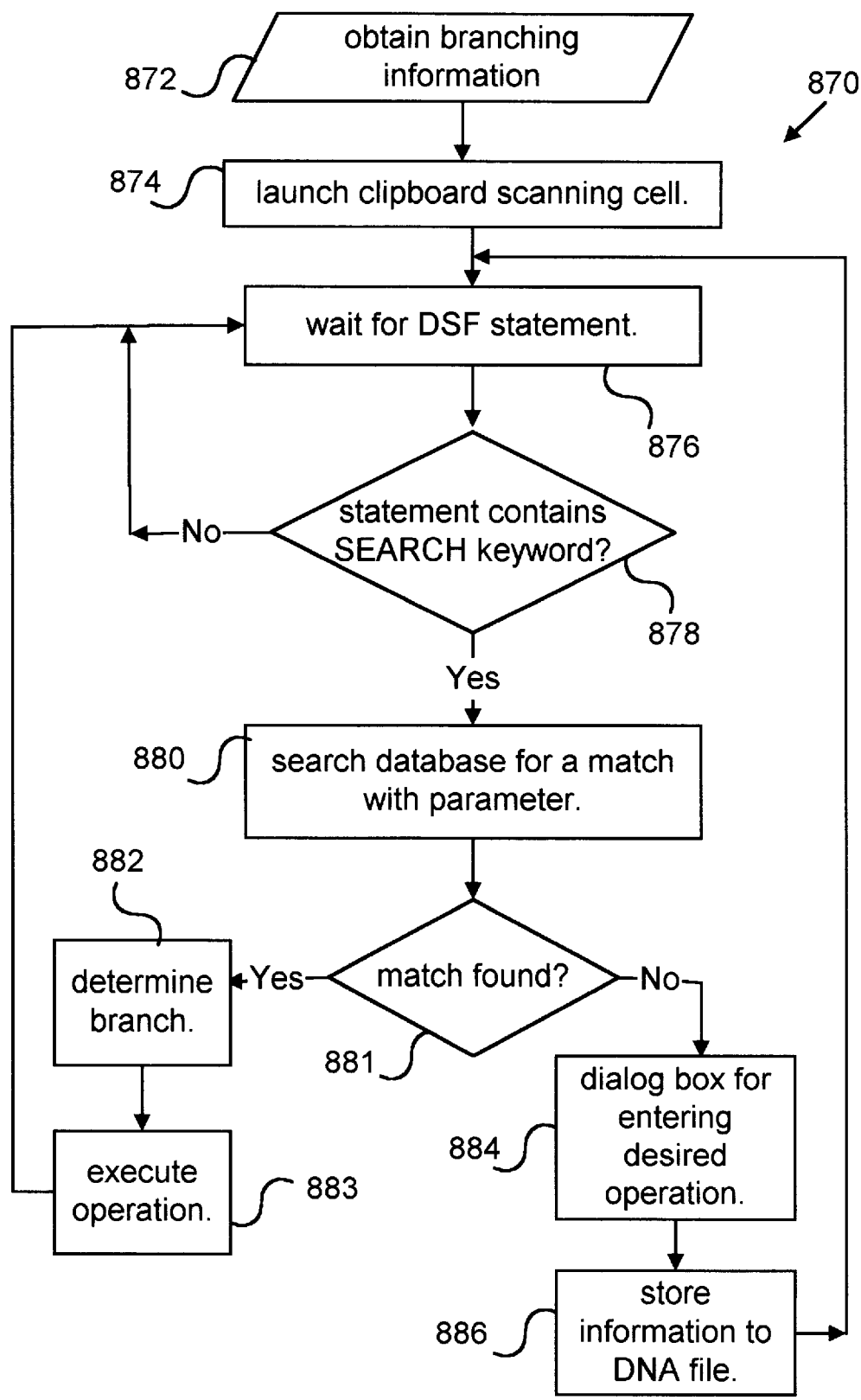
FIG. 3 is a flow chart of a hyperlink and branch cell of the present invention.

FIG. 3 is a flow chart 870 of a hyperlink and branch cell of the present invention. In this embodiment, the database (corresponding to database 714 of FIG. 1) accessible by the hyperlink and branch cell is stored in its DNA file. At step 872, flow chart 870 obtains branching (or selection) information for performing subsequent branching (e.g., the age of the user). At step 874, it launches the clipboard scanning cell. Flow chart 870 then waits for a DSF statement from the scanning cell (step 876). If a DSF statement is received, flow chart 870 determines whether the DSF statement contains a "SEARCH" keyword (step 878). If the "SEARCH" keyword is not found, flow chart 870 branches back to step 876. If a "SEARCH" statement is received from the scanning cell, the hyperlink and branch cell searches its DNA file (i.e., database) for a record having a key-word which is the same as the parameter in the "SEARCH" statement (step 880). Flow chart 870 then determines whether there is a match (step 881). If there is a match, flow chart 870 then uses the branching information (obtained from step 872) to determine which branch to execute (step 882). The operation associated with the selected branch is performed, e.g., the corresponding cell is invoked (step 883). Flow chart 870 then branches back to step 876 and wait for another DSF statement.

If the parameter in the "SEARCH" statement does not match any of the keywords in the database, flow chart 870 goes into an edit mode. A dialogue box is displayed asking a user to enter the branches, the conditions associated with the branches, and a program module (or cell) associated with each branch (step 884). This information is stored in the DNA file of the hyperlink and branch cell (step 886). Flow chart 870 then branches back to step 876 to wait for another DSF statement.

It should be appreciated that the database could be stored in any place. The DNA file of the hyperlink and branch cell is merely a convenient place to hold the database.

It should also be appreciated that the flexible information input and operations selection system can be implemented using convention computer program architecture instead of the digital cell technology. In this case, the clipboard scanning cell and the hyperlink and branch cell can be implemented as two conventional procedures. The communication between the two procedures can be implemented using ordinary procedure calls or using a storage area accessible by both procedures (i.e., one procedure can write to and the other procedure can read from the common storage area). Further, it is possible to use one procedure to implement all the abovementioned steps (e.g., the capturing of data, comparing with a database, branching and invoking a computer operation).

Figure 4:
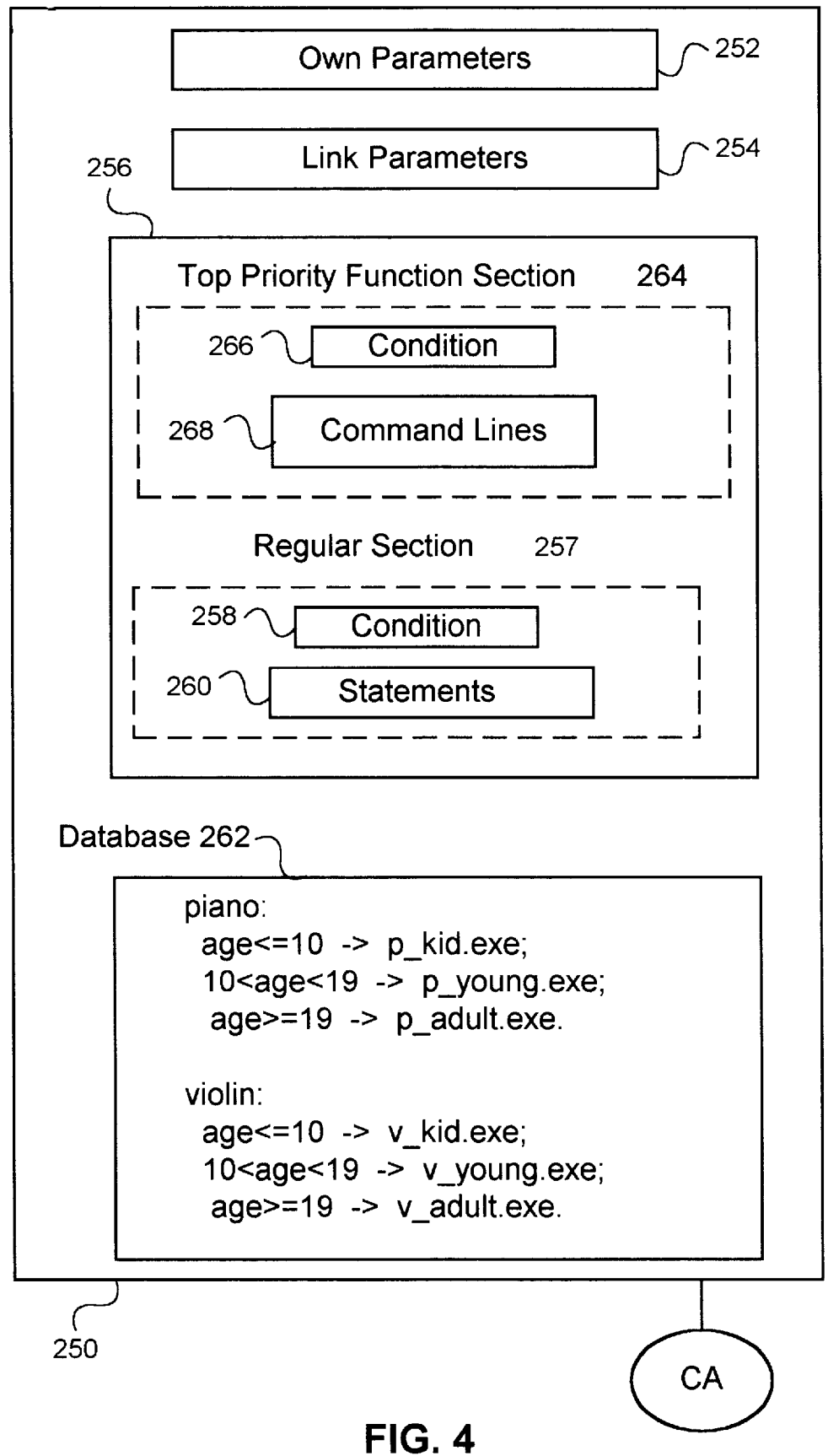
FIG. 4 is a block diagram showing the logical structure of a DNA file associated with a hyperlink and branch cell of the present invention.

The DNA file of the hyperlink and branch cell in this embodiment is the same as the DNA file of a hyperlink cell, discussed in the incorporated patent application Ser. No. 08/582,004, except for the database section 262. FIG. 4 is a block diagram showing the logic structure of a DNA file 250 associated with a hyperlink and branch cell of the present invention.

File 250 contains a section 262 containing the associated database information. The length of this section could be very long, if the size of the database is large. The database contains means for identifying the keys in a record. In this example, a line containing a predetermined symbol, e.g., ":", indicates that the word to the left of the symbol is a key. Thus, the line "piano:" is interpreted to mean that the word "piano" is a key. Section 262 also contains means for identifying a branching condition. In this example, logic relationships to the left of another predetermined symbol, e.g., "->", indicate a branching condition. Thus, the relationship "age<=10" is a condition. Section 262 contains means for identifying an operation associated with a branching condition. In this example, an executable program to the right of the above described "->" symbol indicates a program associated with the condition to the left of the symbol. Thus, the program "p_kid.exe" is associated with users equal to or under ten years old. A predetermined symbol ";" is used to indicate the end of a branch and a predetermined symbol "." is used to indicate the end of a record.

Note that the above described symbols and database format are exemplary. Other symbols and database format could be used.

File 250 contains other sections. These sections are the same as the corresponding sections discussed in the "hyperlink cell" of the incorporated patent application Ser. No. 08/582,004. Specially, it contains (a) a section 252 containing parameters ("own parameters") related to the characteristics of the hyperlink and branch cell itself, (b) a section 254 containing linking parameters ("link parameters") on cells related to the hyperlink and branch cell, and (c) a DSF information section 256 which further includes a regular statements section 257 and a top priority function section 264. Regular section 257 contains a "condition" section 258 and a statement section 260. Top priority function section 264 contains a condition section 266 and a command lines section 268.

It should be appreciated that the logic structure shown in FIG. 4 can be implemented using one or more physical files. Further, portions of the logical section may intermingle physically. In one embodiment of the present invention, the DNA file is a text file. Thus, the content of the DNA file can be modified by using a regular text editor.

The invention has been described with reference to a specific exemplary embodiment thereof Various modification and changes may be made thereunto without departing from the broad spirit and scope of the invention. The specification and drawings are, accordingly, to be regarded in an illustrative rather than a restrictive sense; the invention is limited only by the provided claims.

What is claimed is:

1. A method for a computer to perform an operation associated with data on a display device which has been chosen by a user, comprising the steps of:
   providing a file having data intended to be displayed on said display device, at least a portion of said data containing no embedded link to other files;
   displaying said data of said file on said display device, said portion of said data being displayed in a manner indicating lack of said embedded link;
   providing a database containing a plurality of records, each record containing a keyword and at least one branch, each branch being associated with a program module;
   highlighting, by said user, desired data associated with said portion on said display device;
   comparing said highlighted data with said keywords;
   if a match is found, selecting a branch based on a predefined criterion; and
   executing said program module associated with said branch.

2. The method of claim 1 further comprising the step of editing said database to associate a keyword with said highlighted data if said highlighted data does not match any existing keywords in said database.

3. The method of claim 2 wherein said editing step further comprising the step of providing a dialogue box for entering branches, criteria, and program modules.

4. The method of claim 1 wherein said obtaining step comprises the step of capturing said highlighted data into a buffer.

5. The method of claim 4 wherein said buffer is a clipboard buffer.

6. A method for a computer to perform an operation associated with data on a display device which has been chosen by a user, comprising the steps of:
   providing a file having data intended to be displayed on said display device, at least a portion of said data containing no embedded link to other files;
   displaying said data of said file on said display device, said portion of said data being displayed in a manner indicating lack of said embedded link;
   providing a first database and a second database each containing a plurality of records, each record containing a keyword and at least one branch, each branch being associated with a program module;
   selecting one of said first and said second databases to be an active database;
   highlighting, by said user, desired data associated with said portion on said display device;
   comparing said highlighted data with said keywords in said selected database;
   if a match is found, selecting a branch in said selected database based on a predefined criterion; and
   executing said program module associated with said branch.

7. The method of claim 6 wherein said obtaining step comprises the step of capturing highlighted data into a buffer.

8. A computer system for performing an operation associated with data in a file intended to be displayed on a display device which has been chosen by a user, said data of said file having at least a portion containing no embedded link to other files; said system comprising:
   means for displaying said data of said file on said display device, said portion being displayed in a manner indicating lack of said embedded link;
   a database containing a plurality of records, each record containing a keyword and at least one branch, each branch being associated with a program module;
   means for allowing said user to highlight desired data associated with said portion on said display device;
   means for matching said highlighted data with said keywords;
   means for selecting a branch based on a predefined criterion if a match between said highlighted data and one of said keywords is found; and
   means for executing said program module associated with said branch.

9. The computer system of claim 8 further comprising a buffer for storing said highlighted data and means for capturing said highlighted data to said buffer, wherein said means for matching matches said data in said buffer with said keywords.

10. A computer system for performing an operation associated with data in a file intended to be displayed on a display device which has been chosen by a user, said data of said file having at least a portion containing no embedded link to other files; said system comprising:
    means for displaying said data of said file on said display device, said portion being displayed in a manner indicating lack of said embedded link;
    a database containing a plurality of records, each record containing a keyword and at least one branch, each branch being associated with a program module;
    means for allowing said user to highlight desired data associated with said portion on said display device;
    a first computer program and a second computer program;
    said first computer program comprising:
        means for capturing said highlighted data; and
        means for sending said captured data to said second computer program;
    said second computer program comprising:
        means for receiving said captured data from said first computer program;
        means for matching said captured data with said keywords; and
        means for selecting a branch based on a predefined criterion if a match between said highlighted data and one of said keywords is found; and
    means for executing said program module associated with said branch.

11. The computer system of claim 10 wherein said first and said second computer programs are cells, and wherein said means for sending comprises a DSF statement having said captured data as a parameter.

* * * * *